US008767306B1

(12) United States Patent
Miao et al.

(10) Patent No.: US 8,767,306 B1
(45) Date of Patent: Jul. 1, 2014

(54) DISPLAY SYSTEM

(75) Inventors: Xiaoyu Miao, Sunnyvale, CA (US); Adrian Wong, Mountain View, CA (US); Babak Amirparviz, Mountain View, CA (US); Mark Spitzer, Sharon, MA (US)

(73) Assignee: Google Inc., Mountain View, CA (US)

( * ) Notice: Subject to any disclaimer, the term of this patent is extended or adjusted under 35 U.S.C. 154(b) by 70 days.

(21) Appl. No.: 13/240,994

(22) Filed: Sep. 22, 2011

(51) Int. Cl.
G02B 27/14 (2006.01)
G02B 27/01 (2006.01)
G02B 27/09 (2006.01)

(52) U.S. Cl.
CPC ........ *G02B 27/0172* (2013.01); *G02B 27/0983* (2013.01)
USPC ............................ 359/630; 359/629; 359/633

(58) Field of Classification Search
CPC ................ G02B 27/0172; G02B 27/0983
USPC ..................... 359/629–633; 345/8
See application file for complete search history.

(56) References Cited

U.S. PATENT DOCUMENTS

| | | | |
|---|---|---|---|
| 5,526,184 A | 6/1996 | Tokuhashi et al. | |
| 5,715,337 A | 2/1998 | Spitzer et al. | |
| 5,886,822 A | 3/1999 | Spitzer | |
| 5,943,171 A | 8/1999 | Budd et al. | |
| 5,949,583 A | 9/1999 | Rallison et al. | |
| 6,023,372 A | 2/2000 | Spitzer et al. | |
| 6,091,546 A | 7/2000 | Spitzer | |
| 6,191,892 B1 * | 2/2001 | Isaka et al. | 359/630 |
| 6,201,629 B1 | 3/2001 | McClelland et al. | |
| 6,204,974 B1 | 3/2001 | Spitzer | |
| 6,349,001 B1 | 2/2002 | Spitzer | |
| 6,353,492 B2 | 3/2002 | McClelland et al. | |
| 6,353,503 B1 | 3/2002 | Spitzer et al. | |
| 6,356,392 B1 | 3/2002 | Spitzer | |
| 6,384,982 B1 | 5/2002 | Spitzer | |
| 6,538,799 B2 | 3/2003 | McClelland et al. | |
| 6,618,099 B1 | 9/2003 | Spitzer | |

(Continued)

FOREIGN PATENT DOCUMENTS

WO 2011/060525 A1 5/2011

OTHER PUBLICATIONS

Levola, Tapani, "Diffractive Optics for Virtual Reality Displays", Academic Dissertation, Joensuu 2005, University of Joensuu, Department of Physics, Vaisala Laboratory, 26 pages.

(Continued)

*Primary Examiner* — Scott J Sugarman
*Assistant Examiner* — Daniele Manikeu
(74) *Attorney, Agent, or Firm* — McDonnell Boehnen Hulbert & Berghoff LLP

(57) ABSTRACT

An optical system has an aperture through which virtual and real-world images are viewable along a viewing axis. The optical system may be incorporated into a head-mounted display (HMD). By illuminating a viewing location with an infrared light source, an eye pupil may be illuminated. Infrared light is reflected from the viewing location and is collected with a proximal beam splitter. An image former is configured to reflect at least a portion of the visible light pattern generated by the display panel to form the virtual image and transmit at least a portion of the collected infrared light. The transmitted infrared light may be imaged by a camera. The HMD may use images from the camera to provide, for example, context-sensitive virtual images to a wearer.

23 Claims, 10 Drawing Sheets

(56) References Cited

U.S. PATENT DOCUMENTS

| | | |
|---|---|---|
| 6,693,749 B2 | 2/2004 | King et al. |
| 6,701,038 B2 | 3/2004 | Rensing et al. |
| 6,724,354 B1 | 4/2004 | Spitzer et al. |
| 6,847,336 B1 | 1/2005 | Lemelson et al. |
| 6,862,006 B2 * | 3/2005 | Sato et al. .......................... 345/8 |
| 6,879,443 B2 | 4/2005 | Spitzer et al. |
| 6,916,096 B2 * | 7/2005 | Eberl et al. .................... 351/209 |
| 7,158,096 B1 | 1/2007 | Spitzer |
| 7,192,136 B2 | 3/2007 | Howell et al. |
| 7,242,527 B2 | 7/2007 | Spitzer et al. |
| 7,255,437 B2 | 8/2007 | Howell et al. |
| 7,380,936 B2 | 6/2008 | Howell et al. |
| 7,401,918 B2 | 7/2008 | Howell et al. |
| 7,438,410 B1 | 10/2008 | Howell et al. |
| 7,457,040 B2 | 11/2008 | Amitai |
| 7,481,531 B2 | 1/2009 | Howell et al. |
| 7,500,746 B1 | 3/2009 | Howell et al. |
| 7,500,747 B2 | 3/2009 | Howell et al. |
| 7,522,344 B1 | 4/2009 | Curatu et al. |
| 7,542,210 B2 | 6/2009 | Chirieleison, Sr. |
| 7,543,934 B2 | 6/2009 | Howell et al. |
| 7,581,833 B2 | 9/2009 | Howell et al. |
| 7,621,634 B2 | 11/2009 | Howell et al. |
| 7,663,805 B2 | 2/2010 | Zaloum et al. |
| 7,672,055 B2 | 3/2010 | Amitai |
| 7,677,723 B2 | 3/2010 | Howell et al. |
| 7,724,443 B2 | 5/2010 | Amitari |
| 7,751,122 B2 | 7/2010 | Amitai |
| 7,760,898 B2 | 7/2010 | Howell et al. |
| 7,771,046 B2 | 8/2010 | Howell et al. |
| 7,792,552 B2 | 9/2010 | Thomas et al. |
| 7,806,525 B2 | 10/2010 | Howell et al. |
| 7,843,403 B2 | 11/2010 | Spitzer |
| 7,900,068 B2 | 3/2011 | Weststrate et al. |
| 7,922,321 B2 | 4/2011 | Howell et al. |
| 7,936,518 B2 * | 5/2011 | Takahashi et al. ............ 359/630 |
| 8,004,765 B2 | 8/2011 | Amitai |
| 8,109,629 B2 | 2/2012 | Howell et al. |
| 2003/0090439 A1 | 5/2003 | Spitzer et al. |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2006/0238877 A1 * | 10/2006 | Ashkenazi et al. ........... 359/630 |
| 2008/0219025 A1 | 9/2008 | Spitzer et al. |
| 2009/0122414 A1 | 5/2009 | Amitari |
| 2009/0231687 A1 * | 9/2009 | Yamamoto .................... 359/359 |
| 2010/0046070 A1 | 2/2010 | Mukawa |
| 2010/0103078 A1 | 4/2010 | Mukawa et al. |
| 2010/0149073 A1 | 6/2010 | Chaum et al. |
| 2010/0278480 A1 | 11/2010 | Vasylyev et al. |
| 2011/0043644 A1 | 2/2011 | Munger et al. |
| 2011/0077548 A1 | 3/2011 | Torch |
| 2011/0227820 A1 | 9/2011 | Haddick et al. |

OTHER PUBLICATIONS

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

Cakmakci, Ozan et al., "Head-Worn Displays: A Review," Journal of Display Technology, vol. 2, pp. 199-216, 2006.

Selker, Ted et al., "Eye-R, a Glasses-Mounted Eye Motion Detection Interface," CHI 2001, pp. 179-180, Mar. 31-Apr. 5, 2001.

* cited by examiner

DISPLAY SYSTEM

BACKGROUND

Wearable systems can integrate various elements, such as miniaturized computers, input devices, sensors, detectors, image displays, wireless communication devices as well as image and audio processors, into a device that can be worn by a user. Such devices provide a mobile and lightweight solution to communicating, computing and interacting with one's environment. With the advance of technologies associated with wearable systems and miniaturized optical elements, it has become possible to consider wearable compact optical displays that augment the wearer's experience of the real world.

By placing an image display element close to the wearer's eye(s), an artificial image can be made to overlay the wearer's view of the real world. Such image display elements are incorporated into systems also referred to as "near-eye displays", "head-mounted displays" (HMDs) or "heads-up displays" (HUDs). Depending upon the size of the display element and the distance to the wearer's eye, the artificial image may fill or nearly fill the wearer's field of view.

SUMMARY

In a first aspect, an optical system is provided. The optical system includes a display panel configured to generate a visible light pattern, a proximal beam splitter through which a field of view of a real-world environment and a virtual image are viewable from a viewing location, and an infrared light source configured to illuminate the viewing location with infrared light. The infrared light is reflected from the viewing location into the proximal beam splitter as collected infrared light. The optical system further includes an image former optically coupled to the proximal beam splitter, wherein the image former is configured to reflect at least a portion of the visible light pattern from the display panel to form the virtual image and to transmit at least a portion of the collected infrared light. The optical system further includes a camera optically coupled to the image former, wherein the camera is configured to image the viewing location using the collected infrared light transmitted through the image former.

In a second aspect, a head-mounted display is provided. The head-mounted display includes a head-mounted support and an optical system attached to the head-mounted support, wherein the optical system includes a display panel configured to generate a visible light pattern, a proximal beam splitter through which a field of view of a real-world environment and a virtual image are viewable from a viewing location, and an infrared light source configured to illuminate the viewing location with infrared light such that infrared light is reflected from the viewing location into the proximal beam splitter as collected infrared light. The optical system further includes an image former optically coupled to the proximal beam splitter, wherein the image former is configured to reflect at least a portion of the visible light pattern from the display panel to form the virtual image and to transmit at least a portion of the collected infrared light. The optical system further includes a camera optically coupled to the image former, wherein the camera is configured to image the viewing location using the collected infrared light transmitted through the image former. The head-mounted display further includes a computer, wherein the computer is configured to control the display panel and receive images of the viewing location obtained by the camera.

In a third aspect, a method is provided. The method includes generating a visible light pattern using a display panel and forming a virtual image from the visible light pattern using an image former, wherein the virtual image and a field of view of a real-world environment are viewable from a viewing location. The method further includes illuminating the viewing location with infrared light, collecting infrared light reflected from the viewing location, transmitting at least a portion of the collected infrared light through the image former, and imaging the viewing location using the collected infrared light transmitted through the image former.

DETAILED DESCRIPTION

Figure 1:
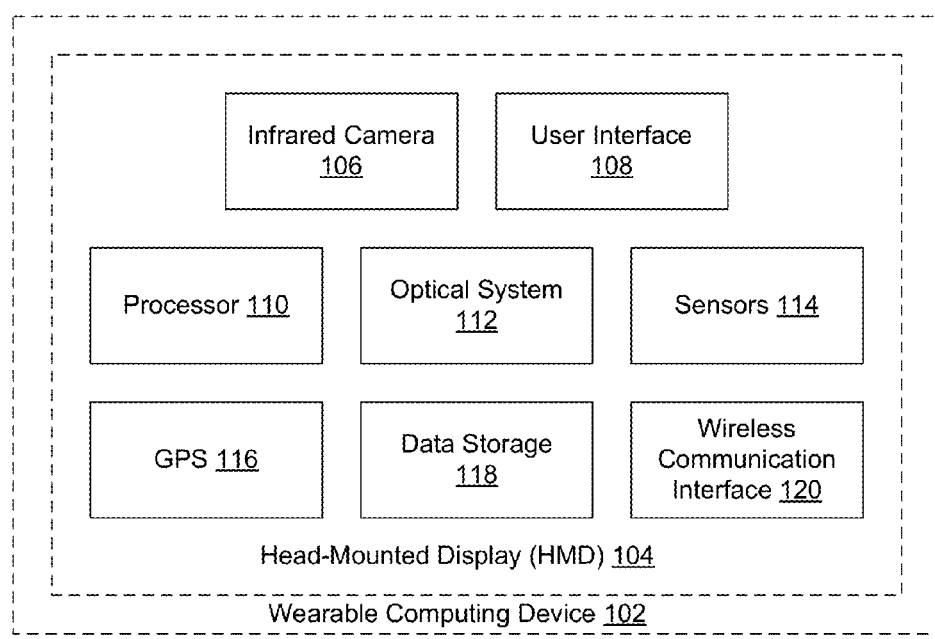
FIG. 1 is a functional block diagram of a wearable computing device, in accordance with an example embodiment.

In the following detailed description, reference is made to the accompanying figures, which form a part thereof. In the figures, similar symbols typically identify similar components, unless context dictates otherwise. The illustrative embodiments described in the detailed description and figures are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. Overview

A head-mounted display (HMD) may enable its wearer to observe the wearer's real-world surroundings and also view a displayed image, such as a computer-generated image. In some cases, the displayed image may overlay a portion of the wearer's field of view of the real world. Thus, while the wearer of the HMD is going about his or her daily activities, such as walking, driving, exercising, etc., the wearer may be able to see a displayed image generated by the HMD at the same time that the wearer is looking out at his or her real-world surroundings.

The displayed image might include, for example, graphics, text, and/or video. The content of the displayed image could relate to any number of contexts, including but not limited to the wearer's current environment, an activity in which the wearer is currently engaged, the biometric status of the wearer, and any audio, video, or textual communications that have been directed to the wearer. The images displayed by the HMD may also be part of an interactive user interface. For example, the HMD could be part of a wearable computing device. Thus, the images displayed by the HMD could include menus, selection boxes, navigation icons, or other user interface features that enable the wearer to invoke functions of the wearable computing device or otherwise interact with the wearable computing device.

The images displayed by the HMD could appear anywhere in the wearer's field of view. For example, the displayed image might occur at or near the center of the wearer's field of view, or the displayed image might be confined to the top, bottom, or a corner of the wearer's field of view. Alternatively, the displayed image might be at the periphery of or entirely outside of the wearer's normal field of view. For example, the displayed image might be positioned such that it is not visible when the wearer looks straight ahead but is visible when the wearer looks in a specific direction, such as up, down, or to one side. In addition, the displayed image might overlay only a small portion of the wearer's field of view, or the displayed image might fill most or all of the wearer's field of view. The displayed image could be displayed continuously or only at certain times (e.g., only when the wearer is engaged in certain activities).

The HMD may utilize an optical system to present virtual images overlaid upon a real-world view to a wearer. To display a virtual image to the wearer, the optical system may include a light source, such as a light-emitting diode (LED), that is configured to illuminate a display panel, such as a liquid crystal-on-silicon (LCOS) display. The display panel generates light patterns by spatially modulating the light from the light source, and an image former forms a virtual image from the light pattern.

The HMD may obtain data from the wearer in order to perform certain functions, for instance to provide context-sensitive information to the wearer. In an example embodiment, by using an infrared camera to record a wearer's pupil position and size, the HMD may obtain information regarding the wearer and the wearer's environment and respond accordingly. The HMD may use a pupil position recognition technique, wherein if the HMD recognizes that the wearer's pupil location is higher with respect to a neutral forward viewing axis, the HMD may display virtual images related to objects located above the wearer. Conversely, the HMD may recognize, by a similar pupil position recognition technique, that the wearer is looking downward. Accordingly the HMD may display virtual images related to objects located below the neutral forward viewing axis of the wearer. Further, if the HMD recognizes that the wearer's pupils are dilated, the HMD may reduce the brightness or adjust other aspects of the displayed virtual images.

In order to determine the actual position of a wearer's pupil, the infrared camera may image the pupil while the processor implements an image processing algorithm to find the edges or extents of the imaged pupil. The image processing algorithms may include pattern recognition, Canny edge detection, thresholding, contrast detection, or differential edge detection. Those skilled in the art will understand that many other image processing techniques could be used individually or in combination with others in order to obtain pupil location and size information. After image processing, the processor may act to adjust various components of the displayed virtual image. For instance, if the user is looking upwards into a clear night sky, the wearable computing device may detect the upward gaze due to pupil location, and control the display to show virtual highlights around and virtual information about various stars and nebulae. Furthermore, due to a dark ambient environment, a user's pupils may be dilated. The wearable computing device may detect this and adjust the virtual image contrast and brightness accordingly.

Certain illustrative examples of using an optical system and infrared light to view a viewing position are described below. It is to be understood, however, that other embodiments are possible and are implicitly considered within the context of the following example embodiments.

2. Optical System with Infrared Source, Camera and Image Former

FIG. 1 is a functional block diagram 100 that illustrates a wearable computing device 102, head-mounted display (HMD) 104 and various components that comprise the system. In an example embodiment, HMD 104 includes a see-through display. Thus, the wearer of wearable computing device 102 may be able to look through HMD 104 and observe a portion of the real-world environment of the wearable computing device 102, i.e., in a particular field of view provided by HMD 104. In addition, HMD 104 is operable to display images that are superimposed on the field of view, for example, to provide an "augmented reality" experience. Some of the images displayed by HMD 104 may be superimposed over particular objects in the field of view. However, HMD 104 may also display images that appear to hover within the field of view instead of being associated with particular objects in the field of view.

The HMD 104 may further include several components such as an infrared camera 106, a user interface 108, a processor 110, optical system 112, sensors 114, a global positioning system (GPS) 116, data storage 118 and a wireless communication interface 120. These components may further work in an interconnected fashion. For instance, in an example embodiment, the infrared camera 106 may image one or both of the HMD wearer's eye pupils. The infrared camera 106 may deliver image information to the processor 110, which may make a determination regarding the direction of HMD wearer's gaze. The wearable computing device 102 may further utilize sensors 114 and GPS 116 to gather contextual information based upon the environment and location of the HMD. By detecting the gaze direction of the wearer's eye(s), context-specific information may be presented to the wearer in various formats such as virtual images as well as audio and vibration cues from the user interface 108. The individual components of the example embodiment will be described in more detail below.

HMD 104 could be configured as, for example, eyeglasses, goggles, a helmet, a hat, a visor, a headband, or in some other form that can be supported on or from the wearer's head. Further, HMD 104 may be configured to display images to both of the wearer's eyes, for example, using two see-through displays. Alternatively, HMD 104 may include only a single see-through display and may display images to only one of the wearer's eyes, either the left eye or the right eye.

The wearable computing device 102 may additionally include an infrared camera 106 that is configured to capture images of a point of view location associated with the HMD 104. The infrared camera 106 may be configured to image the pupil of a HMD wearer that may be located at the point of view location. The images could be either video images or still images. The images obtained by infrared camera 106 regarding the wearer eye pupil location may help determine where the wearer is looking within the HMD field of view. The image analysis could be performed by processor 110.

The imaging of the point of view location could occur continuously or at discrete times depending upon, for instance, user interactions with the user interface 108. Infrared camera 106 could be integrated into optical system 112. Furthermore, infrared camera 106 could additionally represent a visible light camera with sensing capabilities in the infrared wavelengths.

The function of wearable computing device 102 may be controlled by a processor 110 that executes instructions stored in a non-transitory computer readable medium, such as data storage 118. Thus, processor 110 in combination with instructions stored in data storage 118 may function as a controller of wearable computing device 102. As such, processor 110 may control HMD 104 in order to control what images are displayed by HMD 104. Processor 110 may also control wireless communication interface 120 and other components of the HMD system.

In addition to instructions that may be executed by processor 110, data storage 118 may store data that may include a set of calibrated wearer eye pupil positions and a collection of past eye pupil positions. Thus, data storage 118 may function as a database of information related to gaze direction. Such information may be used by wearable computing device 102 to anticipate where the user will look and determine what images are to be displayed to the wearer by HMD 104. Calibrated wearer eye pupil positions may include, for instance, information regarding the extents or range of the wearer's eye pupils movement (right/left and upwards/downwards) as well as wearer eye pupil positions that may relate to a neutral forward viewing axis. The neutral forward viewing axis may represent the axis defined wherein the wearer is looking straight ahead and may further represent a reference axis and thus a basis for determining dynamic gaze direction. Furthermore, information may be stored in data storage 118 regarding possible control instructions that may be enacted using eye movements. For instance, two consecutive wearer eye blinks may represent a control instruction directing a second camera (not depicted) associated with the HMD 104 to capture an image.

Wearable computing device 102 may also include a user interface 108 for displaying information to the wearer or receiving input from the wearer. User interface 108 could include, for example, the displayed virtual images, a touchpad, a keypad, buttons, a microphone, and/or other input devices. Processor 110 may control the functioning of wearable computing device 102 based on input received through user interface 108. For example, processor 110 may utilize user input from the user interface 108 to control how HMD 104 displays images or what images HMD 104 displays.

In one example, the wearable computing device 102 may include a wireless communication interface 120 for wirelessly communicating with the internet and/or target objects near the HMD 104. Wireless communication interface 120 could use any form of wireless communication that can support bi-directional data exchange over a packet network (such as the internet). For example, wireless communication interface 120 could use 3G cellular communication, such as CDMA, EVDO, GSM/GPRS, or 4G cellular communication, such as WiMAX or LTE. Alternatively, wireless communication interface 120 could communicate with a wireless local area network (WLAN), for example, using WiFi. Alternatively, wireless communication interface 120 could be established using an infrared link, Bluetooth, or ZigBee. The wireless communications could be uni-directional or bi-directional with respect to the internet or a target object.

Wearable computing device 102 may further include an optical system 112 that is configured to display virtual images to a wearer. Optical system 112 is described in detail below.

Although FIG. 1 shows various components of HMD 104, i.e., wireless communication interface 120, processor 110, data storage 118, infrared camera 106, sensors 114, GPS 116, and user interface 108, as being integrated into HMD 104, one or more of these components could be mounted or associated separately from HMD 104. For example, infrared camera 106 could be mounted on the user separate from HMD 104. Thus, wearable computing device 102 could be provided in the form of separate devices that can be worn on or carried by the wearer. The separate components that make up wearable computing device 102 could be communicatively coupled together in either a wired or wireless fashion.

Figure 2:
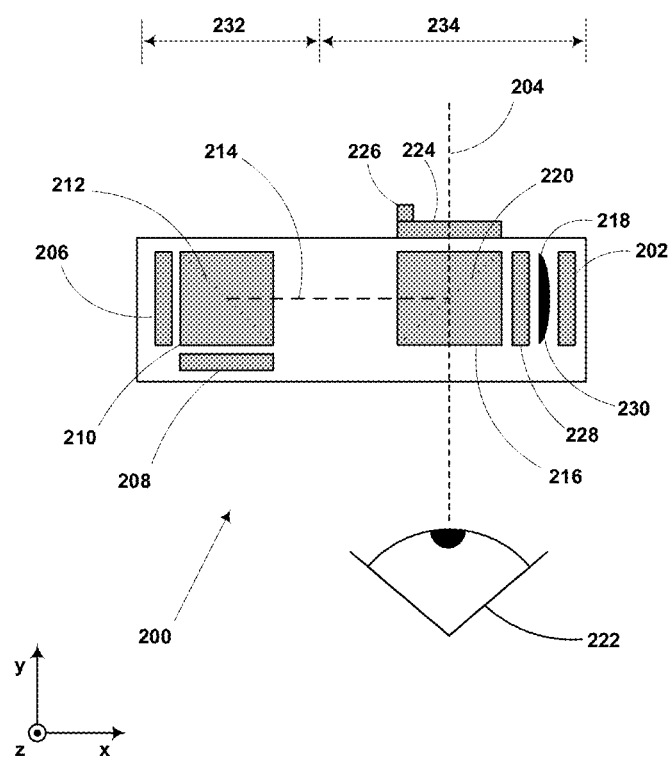
FIG. 2 is a top view of an optical system, in accordance with an example embodiment.

FIG. 2 illustrates a top view of an optical system 200 that is configured to display a virtual image superimposed upon a real-world scene viewable along a viewing axis 204. For clarity, a distal portion 232 and a proximal portion 234 represent optically-coupled portions of the optical system 200 that may or may not be physically separated. An example embodiment includes a display panel 206 that may be illuminated by a light source 208. Light emitted from the light source 208 is incident upon the distal beam splitter 210. The light source 208 may include one or more light-emitting diodes (LEDs) and/or laser diodes. The light source 208 may further include a linear polarizer that acts to pass one particular polarization to the rest of the optical system.

In an example embodiment, the distal beam splitter 210 is a polarizing beam splitter that reflects light depending upon the polarization of light incident upon the beam splitter. To illustrate, s-polarized light from the light source 208 may be preferentially reflected by a distal beam-splitting interface 212 towards the display panel 206. The display panel 206 in the example embodiment is a liquid crystal-on-silicon (LCOS) display, but could also be a digital light projector (DLP) micro-mirror display, or other type of reflective display panel. The display panel 206 acts to spatially-modulate the incident light to generate a light pattern. Alternatively, the display panel 206 may be an emissive-type display such as an organic light-emitting diode (OLED) display or a transmissive liquid crystal display (LCD) with a backlight; in such cases, distal beam splitter 210 and light source 208 may be omitted.

In the example in which the display panel 206 is a LCOS display panel, the display panel 206 generates a light pattern with a polarization perpendicular to the polarization of light initially incident upon the panel. In this example embodiment, the display panel 206 converts incident s-polarized light into a light pattern with p-polarization. The generated light pattern from the display panel 206 is directed towards the distal beam splitter 210. The p-polarized light pattern passes through the distal beam splitter 210 and is directed along an optical axis 214 towards the proximal region of the optical system 200. In an example embodiment, the proximal beam splitter 216 is also a polarizing beam splitter. The light pattern is at least partially transmitted through the proximal beam splitter 216 to the image former 218. In an example embodiment, image former 218 includes a concave mirror 230 and a proximal quarter-wave plate 228. The light pattern passes through the proximal quarter-wave plate 228 and is reflected by the concave mirror 230.

The reflected light pattern passes back through proximal quarter-wave plate 228. Through the interactions with the proximal quarter-wave plate 228 and the concave mirror 230, the light patterns are converted to the s-polarization and are formed into a viewable image. This viewable image is incident upon the proximal beam splitter 216 and the viewable image is reflected from proximal beam splitting interface 220 towards a viewing location 222 along a viewing axis 204. A real-world scene is viewable through a viewing window 224. The viewing window 224 may include a linear polarizer in order to reduce stray light within the optical system. Light from the viewing window 224 is at least partially transmitted through the proximal beam splitter 216. Thus, both a virtual image and a real-world image are viewable to the viewing location 222 through the proximal beam splitter 216.

Although FIG. 2 depicts the distal portion 232 of the optical system housing as to the left of the proximal portion 234 of the optical system housing when viewed from above, it is understood that other embodiments are possible to physically realize the optical system 200, including the distal portion 232 being configured to be to the right, below and above with respect to the proximal portion 234. Further, although an example embodiment describes an image former 218 as comprising a concave mirror 230, it is understood by those skilled in the art that the image former 218 may comprise a different optical element, such as an optical lens or a diffractive optic element.

In one embodiment, the proximal beam splitter 216, the distal beam splitter 210, and other components of optical system 200 are made of glass. Alternatively, some or all of such optical components may be partially or entirely plastic, which can also function to reduce the weight of optical system 200. A suitable plastic material is Zeonex® E48R cyclo olefin optical grade polymer which is available from Zeon Chemicals L.P., Louisville, Ky. Another suitable plastic material is polymethyl methacrylate (PMMA).

Figure 3:
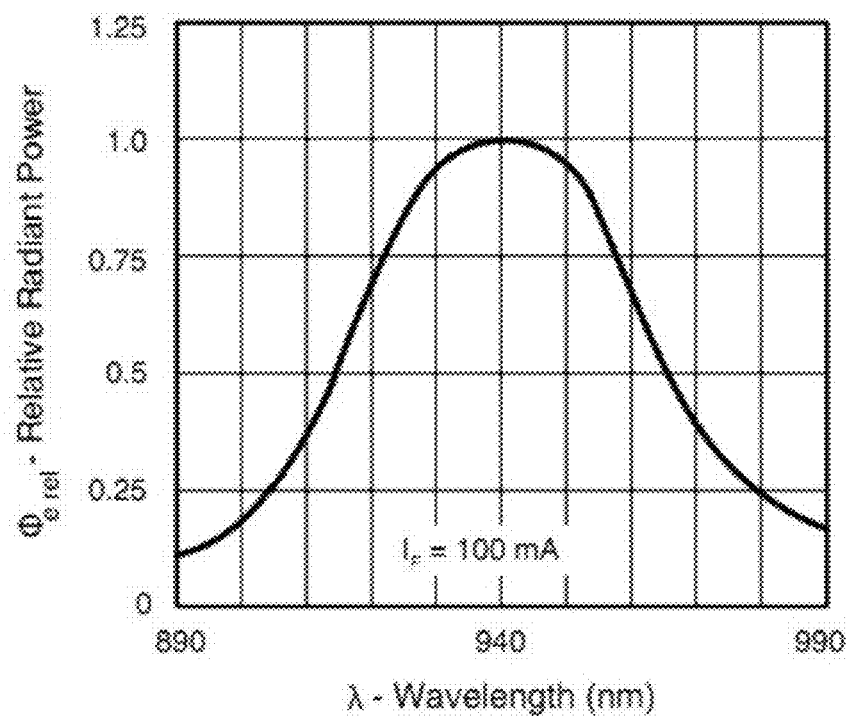
FIG. 3 is a graph illustrating a variation of relative radiant power of an infrared source with respect to wavelength, in accordance with an example embodiment.

An example embodiment may include an infrared light source 226 that is configured to illuminate the viewing location 222. Although FIG. 2 depicts the infrared light source 226 as adjacent to viewing window 224, those skilled in the art will understand that the infrared light source 226 could be located elsewhere, such as on the side of the proximal beam splitter 216 that is adjacent to the viewing location 222 or in the distal portion 232 of the optical system 200. The infrared light source 226 may represent, for example, one or more infrared light-emitting diodes (LEDs). Infrared LEDs with a small size may be implemented, such as the Vishay Technology TSML 1000 product. FIG. 3 is a graph illustrating a variation of relative radiant power of an infrared source with respect to wavelength, in accordance with an example embodiment.

Further, those skilled in the art will understand that, for best eye-tracking accuracy, it may be advantageous to obtain infrared images of the eye pupil using light sources that illuminate the eye from positions off-axis and/or on-axis with respect to the viewing axis 204. Therefore, the infrared light source 226 may include one or more LEDs located at different locations in the optical system 200.

Infrared light generated from the infrared light source 226 is configured to be incident upon the viewing location 222. Thus, the wearer's eye pupil may be illuminated with the infrared light. The infrared light may be reflected from the wearer's eye back along the viewing axis 204 towards the proximal beam splitter 216. A portion of the reflected infrared light may be reflected from the beam splitting interface 220 towards the image former 218.

Figure 4:
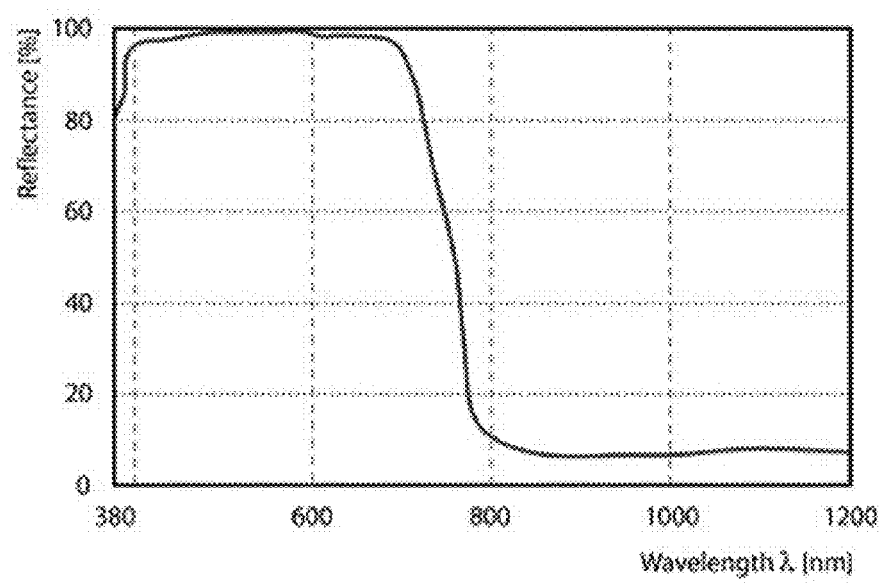
FIG. 4 is a graph illustrating a variation of percentage reflectance with respect to wavelength, in accordance with an example embodiment.

In order to transmit infrared light to an infrared camera 202, the image former 218 may include a dichroic thin film configured to selectively reflect or transmit incident light depending upon the wavelength of the incident light. For instance, the dichroic thin film may be configured to pass infrared light while reflecting visible light. In an example embodiment, the visible light pattern generated by the display panel 206 may be reflected by the concave mirror 230 and the visible light pattern may be formed into a viewable image. The infrared light may thus be preferably transmitted through the concave mirror 230 to infrared camera 202. Dichroic thin film coatings are available commercially from companies such as JML Optical Industries and Precision Glass & Optics (PG&O) and comprise multiple layers of dielectric and/or metal films. These dichroic coatings are also called 'cold mirrors'. FIG. 4 is a graph illustrating a variation of percentage reflectance with respect to wavelength, in accordance with an example embodiment. The graph represents example spectral reflectance characteristics for a dichroic thin film that may coat the concave mirror 230.

In an example embodiment, a small aperture or apertures may be introduced into the image former 218, which may be realized by one or more pinholes (e.g., a central pinhole) in the concave mirror 230. In this example embodiment, most of the visible and infrared light is reflected off of and formed by the image former 218 into an image viewable by the HMD wearer. Some of the visible and infrared light passes through the aperture and is incident upon the infrared camera 202. The infrared camera 202 may selectively filter and detect the infrared light from the combination of visible and infrared light to obtain information regarding the wearer's eye pupil location. Alternatively, the infrared light source 226 may be modulated to provide a frequency reference for a lock-in amplifier or phase-locked loop in order that the infrared light signal is obtained efficiently. Also, the visible light source 208 may be modulated and infrared light detection could be performed when the visible light source 208 is off, for example. Those with skill in the art will understand that there are other variations of transducing an infrared light signal mixed with a visible light signal with an infrared camera and that those variations are included implicitly in this specification.

3. Head-mounted Display with Infrared Eye-Tracking Optical System

Figure 5A:
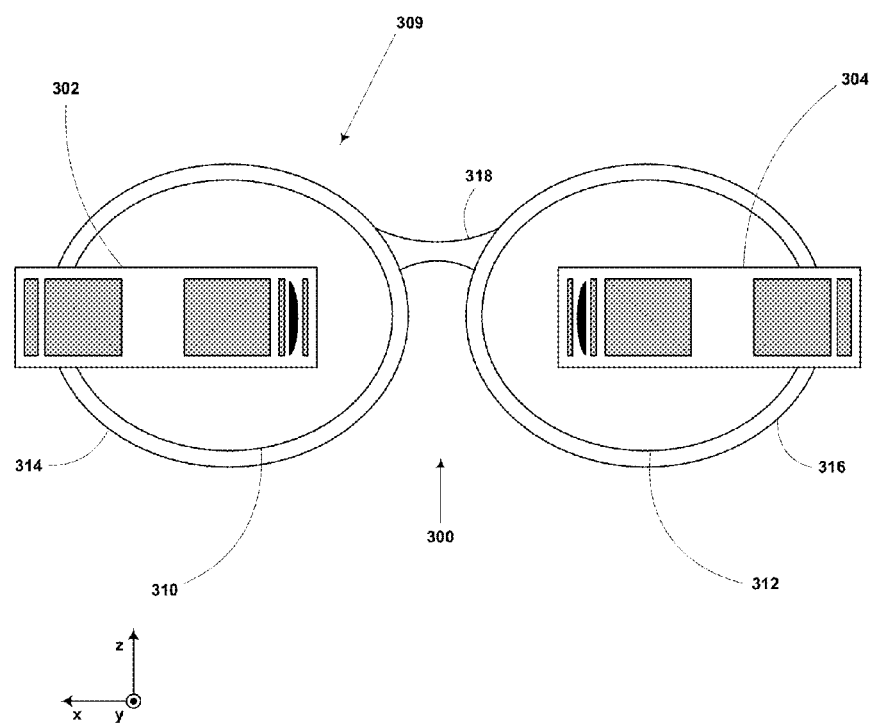
FIG. 5A is a front view of a head-mounted display, in accordance with an example embodiment.
Figure 5B:
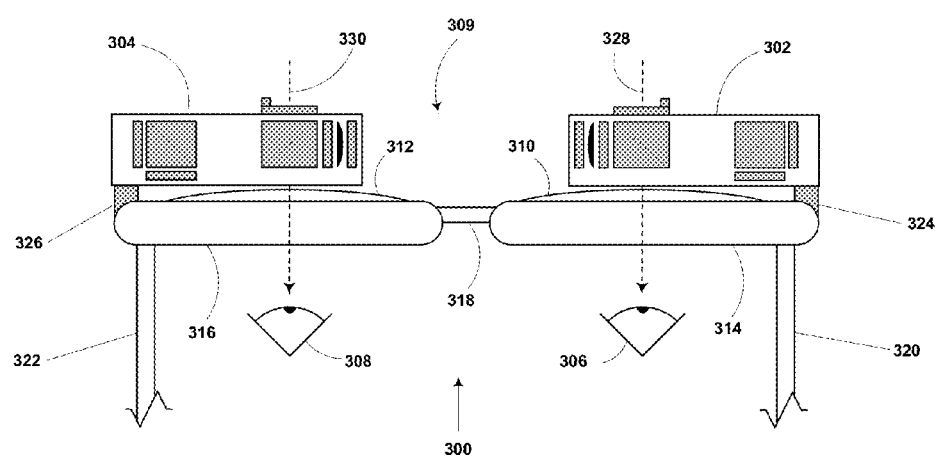
FIG. 5B is a top view of the head-mounted display of FIG. 5A, in accordance with an example embodiment.
Figure 5C:
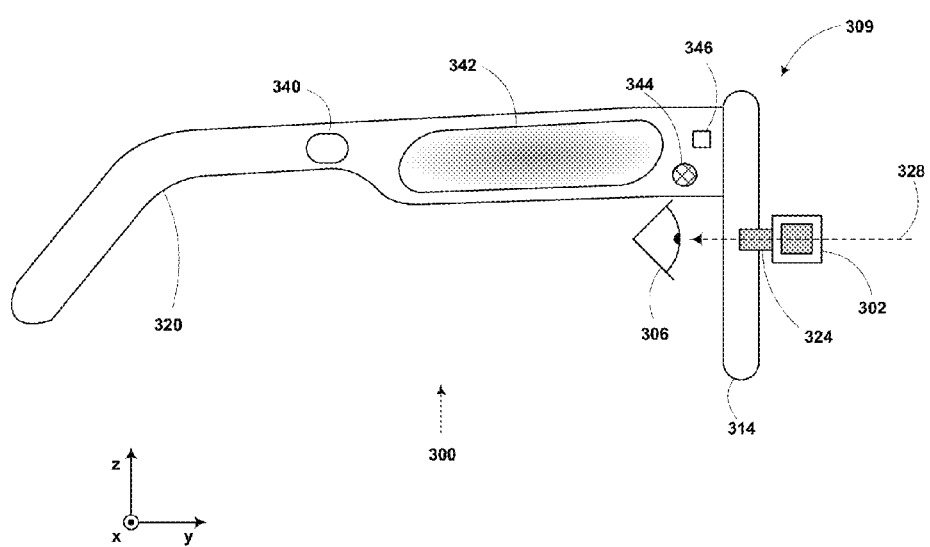
FIG. 5C is a side view of the head-mounted display of FIG. 5A and FIG. 5B, in accordance with an example embodiment.

FIG. 5A presents a front view of a head-mounted display (HMD) 300 in an example embodiment that includes a head-mounted support 309. FIGS. 5B and 5C present the top and side views, respectively, of the HMD in FIG. 5A. Although this example embodiment is provided in an eyeglasses format, it will be understood that wearable systems and HMDs may take other forms, such as hats, goggles, masks, head-bands and helmets. The head-mounted support 309 includes lens frames 314 and 316, a center frame support 318, lens elements 310 and 312, and extending side-arms 320 and 322. The center frame support 318 and side-arms 320 and 322 are configured to secure the head-mounted support 309 to the wearer's head via the wearer's nose and ears, respectively. Each of the frame elements 314, 316, and 318 and the extending side-arms 320 and 322 may be formed of a solid structure of plastic or metal, or may be formed of a hollow structure of similar material so as to allow wiring and component interconnects to be internally routed through the head-mounted support 309. Alternatively or additionally, head-mounted support 309 may support external wiring. Lens elements 310 and 312 are at least partially transparent so as to allow the wearer to look through them. In particular, the wearer's left eye 308 may look through left lens 312 and the wearer's right eye 306 may look through right lens 310. Optical systems 302 and 304, which may be configured as shown in FIG. 2, may be positioned in front of lenses 310 and 312, respectively, as shown in FIGS. 5A, 5B, and 5C. Optical systems 302 and 304 may be attached to the head-mounted support 309 using support mounts 324 and 326, respectively. Furthermore, optical systems 302 and 304 may be integrated partially or completely into lens elements 310 and 312, respectively.

Although this example includes an optical system for each of the wearer's eyes, it is to be understood that a HMD might include an optical system for only one of the wearer's eyes (either left eye 308 or right eye 306). As described in FIG. 2, the HMD wearer may simultaneously observe from optical systems 302 and 304 a real-world image with an overlaid virtual image. The HMD may include various elements such as a HMD computer 340, a touchpad 342, a microphone 344, and a button 346. The computer 340 may use data from, among other sources, various sensors and cameras to determine the virtual image that should be displayed to the user. In an example embodiment, as described earlier, an infrared light source or sources may illuminate the viewing position(s) 308 and 306, i.e. the wearer's eye(s), and the reflected infrared light may be preferentially collected with an infrared camera.

Those skilled in the art would understand that other user input devices, user output devices, wireless communication devices, sensors, and cameras may be reasonably included in such a wearable computing system.

Figure 6:
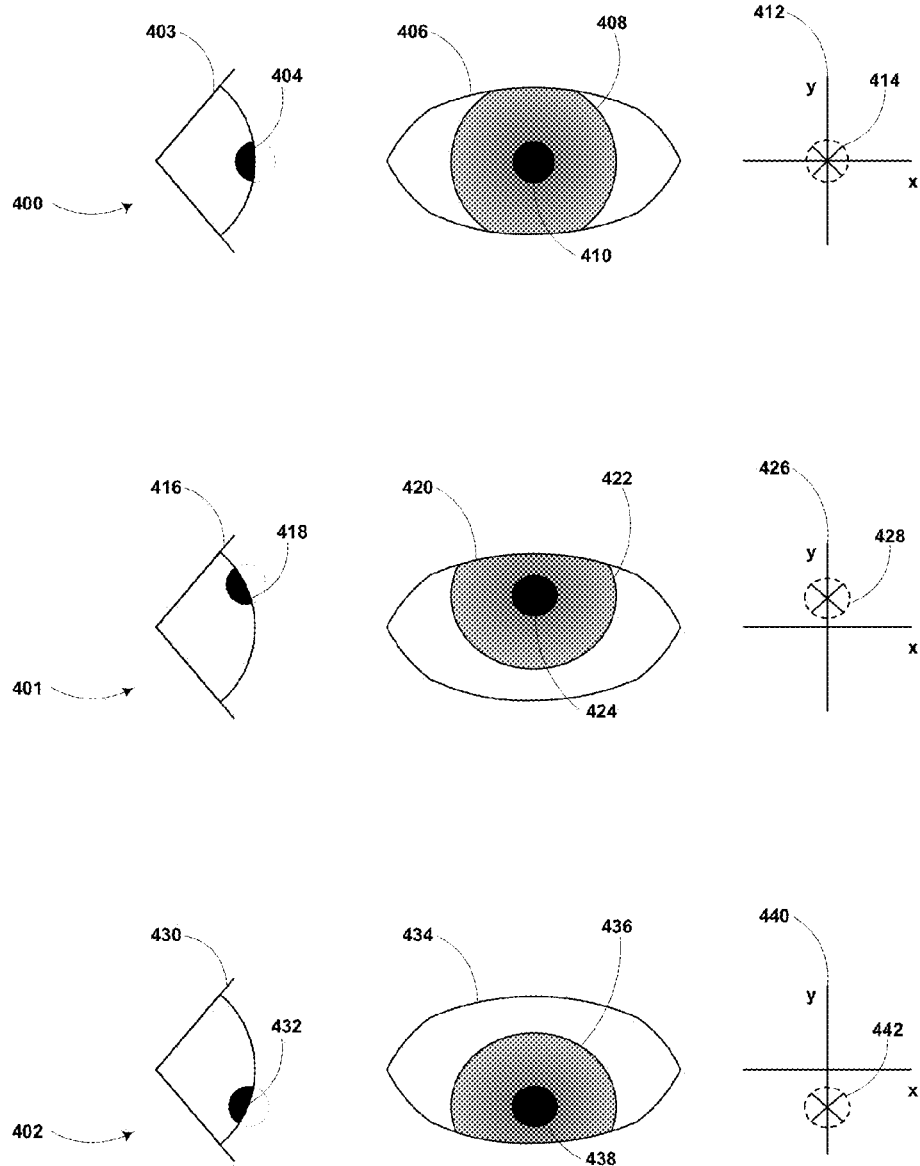
FIG. 6 depicts side and front views of an eye as well as schematic drawings of pupil location information, in accordance with an example embodiment.

FIG. 6 depicts side and front views of an eye as well as schematic drawings of pupil location information. One way to determine gaze direction of a person is to determine the position of the person's pupil with respect to a neutral forward viewing axis. To track eye pupil movements, infrared light is reflected off of a person's eye. The reflected light may be collected and detected with an infrared detector. Image processing can then be conducted with a processor 110 in order to determine the extents and centroid location of the person's pupil. For instance, in an example embodiment 400, a person may be looking directly forward. The eyelid 403 is open and the pupil 404/410 is located centrally with respect to a reference axis 412. After image processing, which may include edge detection, the position of the pupil may be determined to be at pupil location 414. In this embodiment, the determined pupil location 414 coincides with a neutral forward viewing axis. Virtual image display position and context may be adjusted due to the determined pupil location 414.

In an example embodiment 401, a person may be looking upwards with respect to a neutral forward viewing axis. In this situation, imaging the person's eye with infrared light may result in a determined pupil position 428 that is above the neutral forward viewing axis. Virtual images may be displayed above a person's normal field of view and contextual information regarding target objects above a person's normal field of view may be displayed.

In an example embodiment 402, a person may be looking downwards with respect to a neutral forward viewing axis. The determined pupil position 442 may be determined by imaging the person's eye and may be further found to be below a neutral forward viewing axis. Thus, contextual information about target objects including virtual images may be displayed for target objects below the neutral forward viewing axis of the person.

Figure 7:
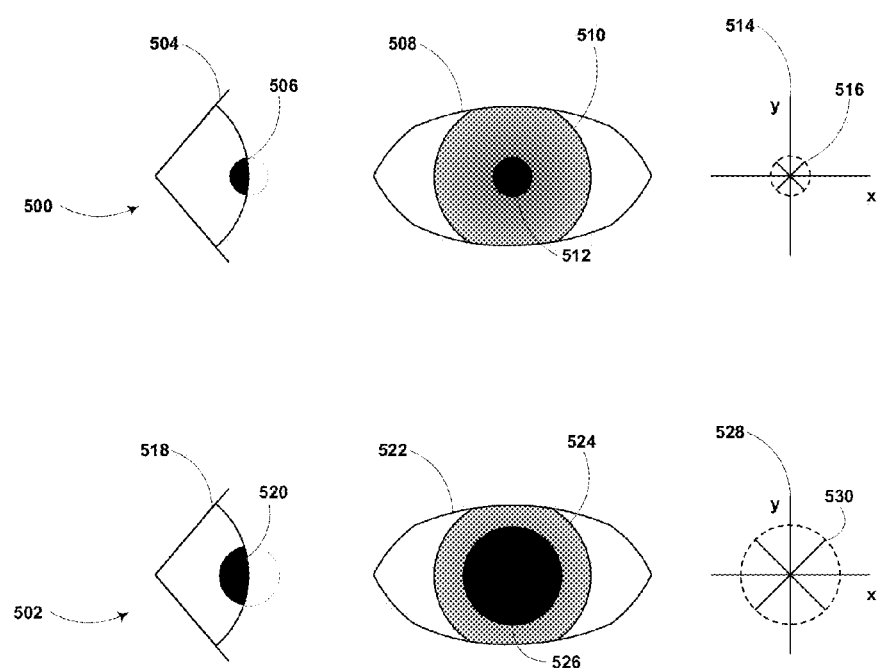
FIG. 7 depicts side and front views of an eye as well as schematic drawings of pupil size information, in accordance with an example embodiment.

FIG. 7 depicts side and front views of an eye as well as schematic drawings of pupil size information. One way to determine the ambient light level of a scene is to determine the diameter of a person's eye pupil who may be looking at the scene. In order to determine the diameter of a pupil, infrared light may be reflected off of a person's eye. The reflected light may be collected and detected with an infrared detector. Image processing can then be conducted with a processor 110 in order to determine the extents and thus the diameter of the person's pupil. For instance, in an example embodiment 500, a person may be looking directly forward and may exhibit a relatively small diameter pupil. The eyelid 504 is open and the pupil 506/512 is located centrally with respect to a reference axis 514. After image processing, which may include edge detection, the position of the pupil may be determined to be at pupil location 516 with a given pupil diameter. Due to a relatively small diameter pupil, the brightness or contrast of the virtual image may be adjusted assuming a bright ambient light level.

Similarly, in an example embodiment 502, a person may exhibit a relatively large diameter pupil. After imaging and image processing, the size and thus the diameter of the pupil may be determined. Due to a relatively large diameter pupil, the brightness or contrast of the virtual image may be adjusted assuming a dark ambient light level.

Further functions of an infrared eye-tracking system may include the recognition of various blink and eye-movement-based commands or control instructions. For instance, image recognition algorithms could recognize a succession of blinks as a command. In an example embodiment, two successive blinks with one eye within half a second may represent a command to take a picture using a second camera on the HMD.

Additionally, an eye-tracking system may allow enhanced functionality when interacting with a user interface of the HMD or of a target object. For instance, if a HMD wearer is looking at an electronic word processing document and the wearable computing device determines that the person is looking at words near the bottom of the user interface, the wearable computing device may automatically scroll the text upwards within the user interface so the person does not need to physically scroll down the page with a mouse wheel.

Figure 8:
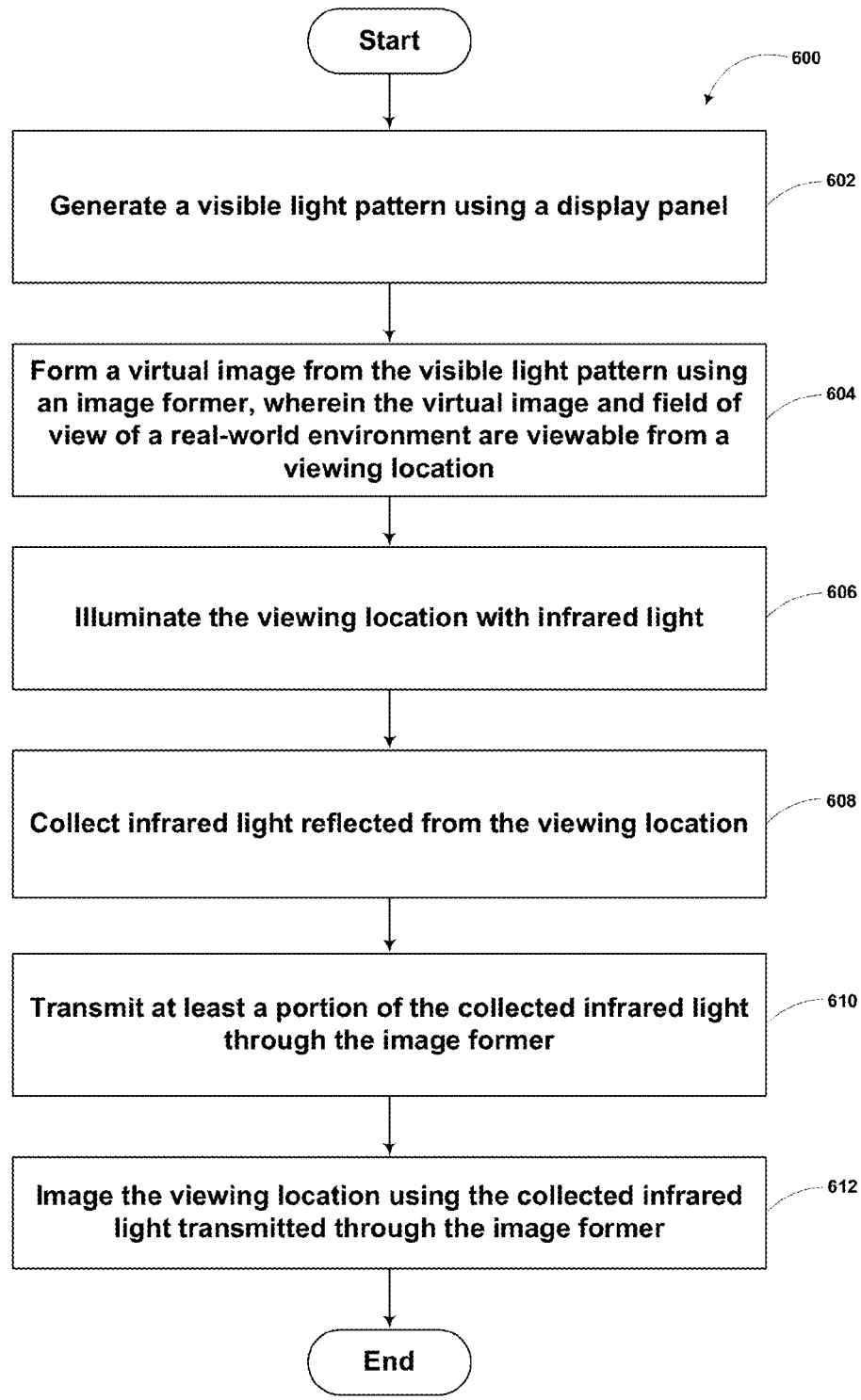
FIG. 8 is a method, in accordance with an example embodiment.

4. Method in an Optical System of Collecting and Imaging Infrared Light from a Viewing Location FIG. 8 illustrates an example method 600 for an optical system to collect and image infrared light from a viewing location. It is to be understood that the steps may appear in different order and steps may be added or subtracted. In a first step 602, a visible light pattern is generated using a display panel. The display panel could be a component in an optical system similar to optical systems 302 and 304. In a second step 604, a virtual image is formed from the visible light pattern using an image former. The image former could include a quarter wave plate 228 and concave mirror 230 that may act together to form the virtual image. The method includes a third step 606 wherein the viewing location is illuminated with infrared light. The viewing location may coincide with where a HMD wearer's eye is located while wearing the HMD. The infrared light may be emitted from one or more sources, such as one or more infrared LEDs. Furthermore, infrared light may be incident upon the viewing location from multiple locations. That is, infrared light may be incident towards the viewing location along a viewing axis 204 as well as along other axes.

A fourth step 608 includes collecting infrared light reflected from the viewing location. As discussed above, infrared light reflected from the wearer's eye may be passed back into the optical system through the proximal beam splitter 216. A portion of the infrared light light may be reflected off of the proximal beam splitting interface 220 and transmitted towards the image former 218.

A fifth step 610 includes transmitting at least a portion of the collected infrared light through the image former. The image former 218 may comprise a concave mirror 230 with a dichroic thin film coating to selectively transmit infrared light and selectively reflect visible light. The image former 218 may alternatively or additionally include an aperture through which visible and infrared light may be transmitted. In both of these situations, infrared light is transmitted through the image former 218.

A sixth step 612 includes imaging the viewing location using the collected infrared light transmitted through the image former. In order to image the viewing location, light may be detected using an infrared camera 202 sensitive to infrared light. The infrared camera may convey video or still images to the processor 110. These images may be used to form the basis of a dynamically updated database of the wearer's eye pupil and its position.

CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An optical system comprising:
a display panel configured to generate a visible light pattern;
an infrared light source configured to illuminate a viewing location with infrared light such that infrared light is reflected from the viewing location as reflected infrared light;
a camera, wherein the camera is configured to image the viewing location based on the reflected infrared light;
an image former optically coupled to the camera and the display panel, wherein the image former is configured to transmit the reflected infrared light through the image former to the camera, and wherein the image former is configured to reflect at least a portion of the visible light pattern to form a virtual image; and
a proximal beam splitter, wherein the proximal beam splitter is configured to transmit light from a real-world environment through the proximal beam splitter to the viewing location, transmit the visible light pattern from the display panel to the image former, reflect the virtual image from the image former to the viewing location, and reflect the reflected infrared light from the viewing location to the image former.

2. The optical system of claim 1, wherein the infrared light source comprises an infrared light-emitting diode (LED).

3. The optical system of claim 2, wherein the infrared LED is configured to illuminate the viewing location through the proximal beam splitter.

4. The optical system of claim 1, further comprising a visible light source.

5. The optical system of claim 4, wherein the display panel is configured to generate the visible light pattern by spatially modulating visible light from the visible light source.

6. The optical system of claim 5, further comprising:
a distal beam splitter optically coupled to the visible light source, display panel, and proximal beam splitter, wherein the distal beam splitter is configured to reflect visible light from the visible light source onto the display panel.

7. The optical system of claim 1, wherein the image former comprises a concave mirror.

8. The optical system of claim 7, wherein the concave mirror comprises a coating of dichroic material that reflects visible light and transmits infrared light.

9. The optical system of claim 1, wherein the image former comprises a concave mirror with a central pinhole.

10. The optical system of claim 9, wherein the camera includes a filter that blocks visible light and transmits infrared light.

11. The optical system of claim 1, wherein the camera is configured to image an eye pupil located at the viewing location.

12. A system comprising:
a head-mountable support;
an optical system attached to the head-mountable support, wherein the optical system comprises:
a display panel configured to generate a visible light pattern;
an infrared light source configured to illuminate a viewing location with infrared light such that infrared light is reflected from the viewing location as reflected infrared light;
a camera, wherein the camera is configured to image the viewing location based on the reflected infrared light;
an image former optically coupled to the camera and the display panel, wherein the image former is configured to transmit the reflected infrared light through the image former to the camera, and wherein the image former is configured to reflect at least a portion of the visible light pattern to form a virtual image; and
a proximal beam splitter, wherein the proximal beam splitter is configured to transmit light from a real-world environment through the proximal beam splitter to the viewing location, transmit the visible light pattern from the display panel to the image former, reflect the virtual image from the image former to the viewing location, and reflect the reflected infrared light from the viewing location to the image former;
a computer, wherein the computer is configured to control the display panel and receive images of the viewing location obtained by the camera.

13. The system of claim 12, wherein the viewing location corresponds to an eye of a wearer of the head-mounted display.

14. The system of claim 13, wherein the computer is configured to determine locations of the pupil of the wearer's eye from the received images.

15. The system of claim 14, wherein the computer is configured to control the display based on the determined pupil locations.

16. A method comprising:
generating a visible light pattern using a display panel;
forming, by reflection from a concave mirror, a virtual image from the visible light pattern, wherein the virtual image and a field of view of a real-world environment are viewable from a viewing location, wherein the concave mirror is configured to transmit infrared light and reflect visible light;
illuminating the viewing location with infrared light;
collecting infrared light reflected from the viewing location;
transmitting, through the concave mirror, at least a portion of the infrared light collected from the viewing location; and
imaging the viewing location using the collected infrared light transmitted through the concave mirror.

17. The method of claim 16, wherein imaging the viewing location comprises capturing at least one image of an eye pupil.

18. The method of claim 17, further comprising:
    determining a location of the eye pupil from the at least one image.

19. The method of claim 18, further comprising controlling the display panel based on the determined location of the eye pupil.

20. The method of claim 17, further comprising:
    determining a direction of motion of the eye pupil from the at least one image.

21. The method of claim 20, further comprising:
    identifying a user instruction based on the determined direction of motion of the eye pupil.

22. The method of claim 17, further comprising:
    determining a size of the eye pupil from the at least one image.

23. The method of claim 22, further comprising:
    adjusting a brightness of the virtual image based on the determined size of the eye pupil.

* * * * *